United States Patent

[11] 3,603,025

| [72] | Inventor | Walter Heubl<br>Muncher Str. 41, 8852 Rain am Lech, Germany |
|---|---|---|
| [21] | Appl. No. | 764,376 |
| [22] | Filed | Sept. 30, 1968 |
| [45] | Patented | Sept. 7, 1971 |
| [32] | Priority | Dec. 1, 1967 |
| [33] | | Germany |
| [31] | | P 16 25 370.6 |

[54] ELEMENTS WITH PLURAL SURFACES HAVING UNIFORMLY SPACED INTERFITTABLE PROJECTIONS
7 Claims, 23 Drawing Figs.

[52] U.S. Cl. .................................................. 46/25,
46/23, 46/30
[51] Int. Cl. ...................................................... A63h 33/06
[50] Field of Search ........................................... 46/16, 17,
22, 23, 25, 26, 29, 30, 31

[56] References Cited
UNITED STATES PATENTS

| 2,566,111 | 8/1951 | Baggott ........................ | 46/221 X |
| 2,722,771 | 11/1955 | Julien ........................... | 46/221 X |
| 3,415,007 | 12/1968 | Howe ............................ | 46/25 X |
| 3,442,044 | 5/1969 | Quercetti ...................... | 46/25 X |

*Primary Examiner*—F. Barry Shay
*Attorney*—Karl F. Ross

ABSTRACT: Structural elements for construction toys, particularly made of synthetic resin material, these structural elements consisting of a core or body with mutually orthogonal rows of connecting projections located on at least one outer side thereof, the projections being capable of engaging with those of other structural elements so as to form an interlocking, frictional connection.

Many types of such of structural are known. These structural elements usually have a basic shape which enables them to be assembled together to form larger structures; for example the basic shape of these structural elements may be that of a cube, a square, a segment or a circle or the like, some of the outer surfaces of the structural elements having suitable connecting means enabling a number of structural elements to be combined together, usually by snap engagement.

In one of these prior art elements humplike protuberances and recesses located therebetween are so provided that they cooperate with portions of complementary shape of the other structural element so as to allow two structural elements to be connected together by snap engagement.

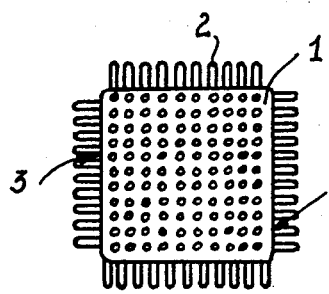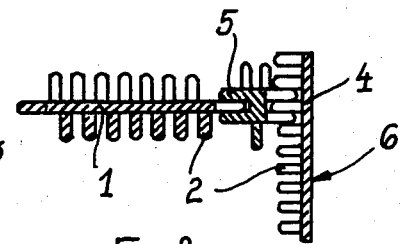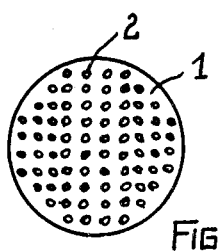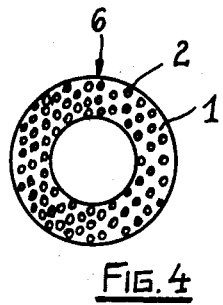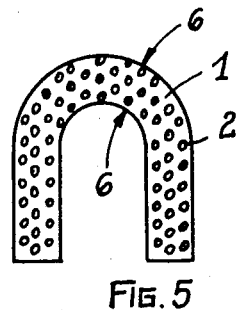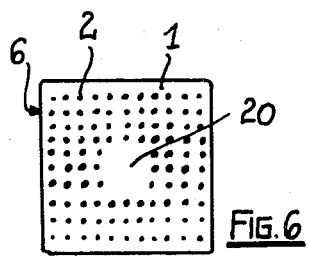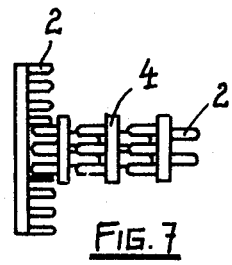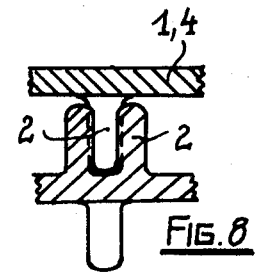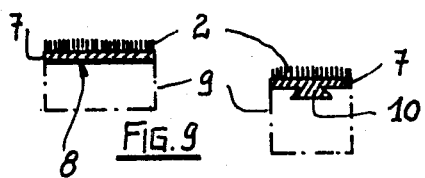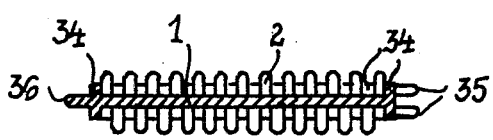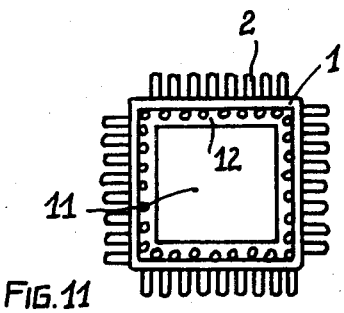

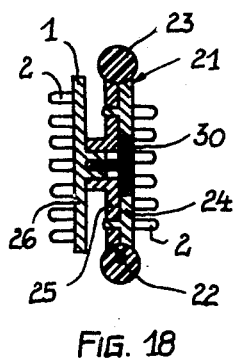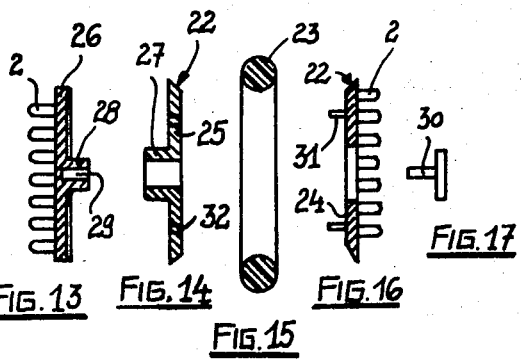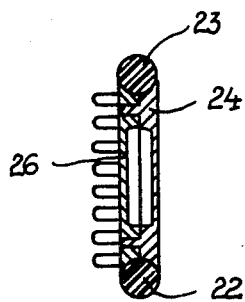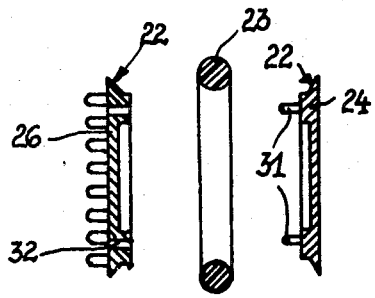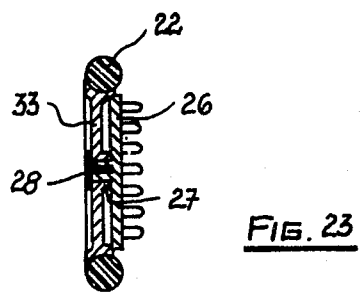

ELEMENTS WITH PLURAL SURFACES HAVING UNIFORMLY SPACED INTERFITTABLE PROJECTIONS

Many types of such structural elements are known. These structural elements usually have a basic shape which enables them to be assembled together to form larger structures; for example the basic shape of these structural elements may be that of a cube, a square, a segment of a circle or the like, some of the outer surfaces of the structural elements having suitable connecting means enabling a number of structural elements to be combined together, usually by snap engagement.

In one of these prior art elements humplike protuberances and recesses located therebetween are so provided that they cooperate with portions of complementary shape of the other structural element so as to allow two structural elements to be connected together by snap engagement.

The drawback of such structural elements resides in the fact that it is only possible to assemble these structural elements with one another with limited variety in the relative positions thereof. Moreover, the snap engagement elements engage one another either too tightly or too loosely, which leads to difficulties in assembling and in dismantling the structural elements.

The object of the invention accordingly consists in eliminating the difficulties associated with the known structural elements and in providing new structural elements which can easily be assembled together and easily separated from one another, so that they may be connected together in a wide variety of ways and in all directions.

According to the invention the connecting elements consists of a plurality of pinlike prongs which are provided in longitudinal and transverse (orthogonal arrays) rows on the core element, in the manner of the bristle of a brush and with a uniform distance between all the adjacent pinlike prongs, so that the gaps between the pinlike prongs can receive the prongs of other structural elements so as to form a secure gripping connection, all these pinlike prongs being of the same size.

Whereas in the case of prior art arrangements for each smallest structural element only one connecting element customarily engages, another structural element, in the system of the present invention a plurality of pinlike prongs engage in one another in the manner of the bristles of brushes which have been forced together. This enables a much wider variety of connections to be realized between any two structural elements.

According to the invention it is possible to construct any three-dimensional models with the simplest structural elements. The particular advantage of the invention resides in the psychological effect on young children who are not yet able to construct models on the basis of instructions. Owing to the simple mode of connecting together the individual structural elements the imagination of the children is stimulated to a remarkable extent, so that the children are able to construct lifelike, imaginative, or abstract models by themselves. In this way the creative instincts of the children are developed to a remarkable degree.

The elements according to the invention may comprise core elements of any desired shape. In practice, it has been found that structural elements with square, rectangular, and circular basic shapes have proved most suitable. Rotary elements such as wheels, bearings and the like may also be constructed within the context of the invention, if at least one of a number of structural parts, which are to be arranged to rotate relative to one another, are provided with the pinlike prongs.

Further features and details of the invention are apparent from the drawing. In the drawing the invention is illustrated diagrammatically. In the drawing:

FIG. 1 is a plan view of a structural element according to the invention;

FIG. 2 is a side view partially in section of a plurality of structural elements as shown in FIG. 1, these elements being connected together;

FIGS. 3 to 5 are modifications of the shape of a core element shown in FIG. 1;

FIG. 6 is a plan view of a modification of the core element shown in FIG. 1;

FIG. 7 is a side elevational view of the structural element shown in FIG. 6, with a number of parts assembled together to form a column;

FIG. 8 is a cross-sectional view through a number of pinlike prongs which are interlockingly assembled together;

FIGS. 9 and 10 are respectively a side elevational view and a front elevational view of thin-walled, core elements constructed according to the invention and provided with pinlike prongs;

FIG. 11 is a plan view of a structural element provided with an opening;

FIG. 12 is a longitudinal section through a structural element which is provided with an edge portion which passes around the said structural element;

FIGS. 13 to 17 are longitudinal sectional views through individual parts used for assembling a wheellike structural element;

FIG. 18 is a longitudinal section through the elements shown in FIGS. 13 to 17;

FIGS. 19 to 21 are longitudinal sectional views through parts of another wheel arrangement;

FIG. 22 is a longitudinal section through the assembled wheel arrangement shown in FIGS. 19 to 21; and FIG. 23 is a longitudinal section through a further modification of a wheellike structural element.

In FIGS. 1 to 7 are shown a few shapes of the structural element by means of which it is possible to build large structures by the interconnection of a large number of such structural elements; there is no limitation intended to any particular ways of interconnecting these parts for assembling the larger structures.

To this end the structural element shown in FIG. 1 comprises a core element 1 which determines the shape of the structural element. Pinlike prongs 2 may be arranged on any of the outside surfaces 3 of the core element 1 in such manner that the core element 1 can be connected to one another on the sides which bear the said pinlike prongs 2. The wall thickness of the core element preferably corresponds to the diameter of a pinlike prong 2.

In the embodiments shown the structural elements consist of synthetic resin material, so that the pinlike prongs 2 form an integral part of the core element 1. The pinlike prongs 2 are preferably resilient and arranged sufficiently close to one another that—when two or three core elements 1 are connected together, as is shown in FIG. 2—the oppositely directed pinlike prongs 2 engage in one another in an interlocking, frictional connection. This means that the core elements 1 can be connected to one another in such manner that they lie in alignment (registration) with one another or alternatively out of alignment with respect to each other, the assumption being made that a sufficient number of these pinlike prongs 2 engage with one another in firm-gripping, frictional and interlocking connection.

The pinlike prongs 2 are so offset, with regard to opposite lying surfaces 3 of the same structural element 1, that the position of a pinlike prong on one side 3 corresponds to a gap defined between the pinlike prongs 2 located on the other side 3. This arrangement makes it possible to attach together structural elements 1 which are of the same size, so that they are in mutual alignment.

FIG. 2 shows, further, that it is possible to establish a connection in which the pinlike prongs 2 lie perpendicular to one another; in this Figure a cover plate 4 has pinlike prongs 2 which are arranged at a suitable position and is connected to the unit constituted by the core elements 1. Suitable intermediate parts 5 enable a number of structural elements 1 to be connected together in the same plane.

In the embodiments of FIGS. 3 to 5 there is shown a number of the basic shapes which it is possible to give the structural elements; in FIG. 3 the structural element shown is of circular shape, in FIG. 4 of hollow cylindrical shape, and in FIG. 5 the structural element shown is U-shaped. Whereas in the embodiment shown in FIG. 1 the pinlike prongs 2 are arranged on all sides of the core element 1, in the embodiments shown in FIGS. 3 to 5 the peripheral surfaces 6 are smooth—or are shaped in some other way, it being understood that they are free of pinlike prongs 2—whereas the pinlike prongs 2 are provided on the faces or end walls of these elements, so that it is possible to assemble together a number of these structural elements by the pinlike prongs on their faces (or end walls) so as to construct a long column, a long tube, a tunnel or the like.

In the embodiment shown in FIG. 6, an area 20 in the center of the structural element is left free of these pinlike prongs; it is intended that the ejector device in an injection molding or extrusion machine will be able to engage this surface 20 which is left free of prongs, so that the ejector will not need to make contact with the prongs.

As shown in FIG. 7, this surface 20 which is free of prongs may be used for example for guiding or receiving structural elements 4 or extension of these elements 4, which are assembled together in the form of columns.

Finally, FIG. 8 shows in enlarged manner the interlocking frictional connection between the pinlike prongs 2, which have for example a length of about 5 mm. a diameter of 2 mm. and a distance between the axes of adjacent prongs of about 2.75 mm.

FIGS. 9 and 10 illustrate a further embodiment of the invention gives the purchaser the opportunity to connect together relatively large structural elements which he has himself formed. The pinlike prongs 2 in these embodiments are located on base bodies 7, which are also relatively thin-walled base bodies 7 may be connected in a suitable manner to the structural elements 9 proper. In the embodiment shown in FIG. 9 the base body 7 has a layer of adhesive, preferably in the form of a so-called contact adhesive, so that the base bodies 7 can be glued to any smooth surfaces of a structural element 9 and thereby enable this surface to be connected to a countersurface of complementary shape. It will be understood that it is possible to manufacture the base body 7 with large surfaces, so that the required part surfaces can be separated from these large manufactured surfaces.

In the embodiment shown in FIG. 10 a dovetail guide 10 is shown as the connecting means between the base body 7 and the structural element 9.

There are numerous ways in which such bodies 7 can be connected to appropriate structural elements 9, for example by the use of magnetic force, by plug and socket connections, interlocking elements (clips) and the like.

In the embodiment shown in FIG. 11, the core element 1 has an opening 11 so that only the remaining part of the frame 12 is provided, entirely or partially, with the pinlike prongs 2. In this way it is possible to give the impression of a window, or a door, or some other opening in an extremely simple manner, without incurring substantial expense for the manufacturing tools. Naturally, the openings 11 may be of various shapes and sizes which will also determine the overall shape of the structural element itself.

The embodiment shown in FIG. 12 illustrates a structural element which, owing to its special arrangement of pinlike prongs 2, is adapted to be assembled to form larger wall surfaces. The core element 1 has, on at least two opposite lying edges, flange surfaces 34 which extend perpendicularly to the plane of the core element, the height of these flange surfaces being greater than the thickness of the core element 1. Preferably these flange surfaces 34 extend right round the core element 1 so as to form a type of frame. Arranged on opposite flange surfaces 34, are respectively, a double row 35 of pinlike prongs and a single row 36 of these pinlike prongs, the prongs being so disposed that the double row of prongs 35 can be arranged to interlockingly engage a single row of prongs of an adjacent structural element. It is clear from the drawing that the height of the flange surfaces 34 approximately corresponds to the sum of the diameters of three pinlike prongs. The prongs located on the larger surfaces of the core element 1 pass outwardly from the core element so that the structural elements according to the invention are capable of being assembled together in a very wide variety of ways, whereas the consumption of material required is minimal. Naturally, it is possible to increase the number of rows of prongs on the narrow edge surfaces; in any case it is to be recommended to arrange an even number of rows on one edge and an odd number of rows of these prongs on the opposite edge.

The embodiment shown in FIGS. 13 to 23 show different ways in which the structural element according to the invention can be assembled together to form wheels or other parts of rotatable assemblies.

The assembly of structural elements shown in FIGS. 13–18 comprises an end disc 24 and an intermediate disc 25 on whose periphery a guide 22 is provided which is intended to receive a ring 23 which resembles a tire. These guides 22 consist of tapered or bevelled surfaces of the peripheral edge of the individual parts. The end disc 24 can be so connected, by means of pins 31, to the intermediate disc 25—which has bores 32 which are of complementary shape to the pins 31— that the tirelike ring 23 will be securely engaged between these two discs 24 and 25. The hub 27 provided on the intermediate disc 25 can then be caused to rotatably engage the connecting stud 28 of the other end disc 26 so as to form a rotatable connection between the two parts. A plug 30 is introduced, from the side of the end disc 24 and through the hub 27, into the bore 29 of the other end disc 26, for the purpose of axially securing the assembly of relatively rotatable parts which has thus been formed, a securely gripping connection being realized by the use of appropriate dimensions for the interlocking parts.

FIG. 18 shows a wheel assembly of this kind in the actually assembled condition. It is clear from this Figure that an intermediate space is defined between the end disc 26 and the intermediate disc 25, this intermediate space being determined by the length of the hub 27. It is naturally possible to arrange for this intermediate space to be wider or narrower according to the shape required for the toy. In any case it is now possible to attach to the end disc 24,26 of this wheel assembly other structural elements which may be of any desired shape and which are equipped with prongs 2, so that the assembly of structural elements shown in FIGS. 13 to 18 may be used for example as a wheel for a toy vehicle, an imitation slewing track ring for a toy crane, or as an imitation bearing for part of a toy windmill or the like. The possibilities of practical application are so numerous that it is impossible to indicate them all by the embodiments which are shown and described.

In the other embodiment shown in FIGS. 20 to 22 the assembly, shown in FIGS. 13 to 18, realized by means of the hubs connecting studs 27,28 is dispensed with. As an alternative to the arrangement shown in FIGS. 13 to 18, the end discs 24,26 together with their guides 22 are so constructed that, when these two end discs are securely interlocked one with the other, the guide 22 of these end discs 24,26 forms a sliding fit for the tirelike ring 23 located between these end discs 24,26. Thus, the ring 23 can rotate in its guide 22. In this way it is possible to restrict the assembly of structural elements for a wheel to three parts. In this connection the assumption is of course made that the tirelike ring 23 consists of a material which is comparatively rigid and which consists of a dimensionally stable material, for example polystyrene, polyamide or the like, and that the friction between this ring 23 and the guide 22 will be relatively small. It is also possible in this case to use connecting pins 31 and bores 32 of complementary shape for connecting together the end discs 24,26. Conveniently, each of these end discs 24,26 comprises pinlike prongs 2 which enable it to be fixed to other structural elements. If it is desired to construct a wheel in such manner that one of its side faces is without the connecting prongs, then one of the end discs 24,26 will be arranged to be without prongs in a corresponding manner.

The embodiment of the invention as shown in FIG. 23 shows an assembly of structural elements for forming a wheel, in which the tirelike ring 23 consists of a resilient material, for example rubber, polyethylene, or soft PVC, so that this ring 23 can be drawn over its guide 22 by expanding it. For this reason, it is also possible to utilize a single-part guide disc 33 which can be connected to an end disc 26 by means of a plug 30 shown in FIG. 17; in this embodiment also the rotational connection is realized by means of a mounting formed by the hub 27 and the connecting stud 28.

What I claim is:

1. A structural element for toys and the like which comprises a generally flat body having at least one broad planar surface extending over a major face of the body and a multiplicity of mutually orthogonal rows of uniform-cross section individual projections, each extending perpendicularly directly from said surface and fixed to said body, said projections substantially completely covering said surface within the outline thereof and providing a uniform lattice of projections, each of said projections being substantially cylindrical and of a length exceeding the diameter thereof, said projections being equispaced from one another by a distance enabling the space between a pair of neighboring projections in each of two neighboring rows to receive a similar projection on another such element between them with said pairs of projections contacting and frictionally retaining the same, said element having at least one additional surface with mutually orthogonal rows of projections thereon, said latter projections having the same shape and spacing as said first-mentioned projections and extending directly from said additional surface.

2. The structural element defined in claim 1 wherein said body has substantially uniform thickness corresponding approximately to the diameter of the projections.

3. The structural element defined in claim 2 wherein said body has a pair of flat parallel surfaces provided with said mutually orthogonal rows of spaced-apart projections and the projections of each of said pair of surfaces extending in a direction opposite the direction of the projections of the other surface of said pair, said pair of surfaces being circumscribed by flanges extending from said body in the directions of the respective projections of said pair of surfaces and defining faces perpendicular to said surfaces, said faces being further provided with cylindrical projections perpendicular thereto and of a configuration corresponding to those of the projections of said surfaces.

4. A structural element for toys and the like which comprises a generally flat body having a pair of parallel broad planar surfaces, each said surface extending over a major face of the body and having a multiplicity of mutually orthogonal rows of individual projections, each extending perpendicularly from its respective surface and fixed to said body, said projections substantially completely covering said surfaces within the outline thereof, each of said projections being substantially cylindrical and of a length exceeding the diameter thereof, said projections on said respective surfaces being equispaced from one another by a distance enabling the space between a pair of neighboring projections in each of two neighboring rows to receive a similar projection on another such element between them with said pairs of projections contacting and frictionally retaining the same, said body having substantially uniform thickness corresponding approximately to the diameter of the projections, the projections of each said surface extending in a direction opposite the direction of the projections of the other surface, said surfaces being circumscribed by flanges extending from said body in the direction of the respective multiplicities of projections and defining at least one pair of opposite faces perpendicular to said surfaces, said faces defined by said flanges being further provided with cylindrical projections perpendicular thereto and of a configuration and spacing corresponding to those of the projections of said surfaces, the projections on one of said surfaces being offset from the projections of the other of said surfaces to enable the projections of said one surface and the projections of said other surface of two such elements to be frictionally interfitting with the elements being in mutual alignment, one of the flange faces having at least two rows of said projections and the other flange face having a lesser number of rows of said projections, thereby enabling the projections of the flange faces of similar structural elements to frictionally interfit and to interfit with the projections of said surfaces.

5. The structural element defined in claim 4 wherein said body is elastically yieldable.

6. The structural element defined in claim 1 wherein said body is generally round and has a rim free from projections.

7. The structural element defined in claim 1 further comprising an opening formed in said body, said broad planar surface framing said opening.